(12) United States Patent
Zang et al.

(10) Patent No.: US 11,976,378 B2
(45) Date of Patent: May 7, 2024

(54) DEVICE AND METHOD FOR PREVENTING COPPER PLATING OF CONDUCTOR ROLL

(71) Applicant: Chongqing JIMAT New Material Technology Co., Ltd., Chongqing (CN)

(72) Inventors: Shiwei Zang, Chongqing (CN); Wenqing Liu, Chongqing (CN)

(73) Assignee: Chongqing JIMAT New Material Technology Co., Ltd., Chongqing (CN)

( * ) Notice: Subject to any disclaimer, the term of this patent is extended or adjusted under 35 U.S.C. 154(b) by 60 days.

(21) Appl. No.: 17/752,105

(22) Filed: May 24, 2022

(65) Prior Publication Data

US 2022/0282390 A1 Sep. 8, 2022

Related U.S. Application Data

(63) Continuation of application No. PCT/CN2021/099457, filed on Jun. 10, 2021.

(30) Foreign Application Priority Data

Dec. 4, 2020 (CN) .......................... 202011398289.9

(51) Int. Cl.
*C25D 3/38* (2006.01)
*C25C 1/12* (2006.01)
(Continued)

(52) U.S. Cl.
CPC .................. *C25D 3/38* (2013.01); *C25C 1/12* (2013.01); *C25D 7/0657* (2013.01); *C25D 17/10* (2013.01); *C25D 21/00* (2013.01)

(58) Field of Classification Search
CPC ............ C25D 3/38; C25D 7/0657; C25C 1/12
See application file for complete search history.

(56) References Cited

U.S. PATENT DOCUMENTS 2,652,461 A * 9/1953 Klein .................. C25D 7/0657
204/279
3,575,829 A * 4/1971 Germain et al. ...... C25D 7/0635
205/93
2012/0073977 A1 3/2012 Tachi et al.

FOREIGN PATENT DOCUMENTS

CN 202047151 U 11/2011
CN 202688479 U 1/2013
(Continued)

*Primary Examiner* — Wojciech Haske
(74) *Attorney, Agent, or Firm* — IPro, PLLC

(57) ABSTRACT

The present invention discloses a device and method for preventing copper plating of a conductor roll in the technical field of manufacturing of copper electroplating films. A conductor roll and an electroplating anode are respectively connected to the negative output end and the positive output end of a first power source, the conductor roll and the electroplating anode electroplate a plating product flowing through plating pool bath after being electrified, and the conductor roll is connected to the positive output end of a second power source and mated with an auxiliary electrode connected to the negative output end of the second power source to realize the electrolysis of the conductor roll so that the conductor roll avoids copper deposition when electroplating the plating product. The present invention can realize the electrolysis of bath near the conductor roll on the premise of completing electroplating by the conductor roll so that the copper electroplating process and the copper electrolyzing process are balanced on the conductor roll to avoid residual copper on the conductor roll so as to improve the copper plating quality of the plating product, and the present invention does not increase the procedure of the electroplating process or affect the implementation of the electroplating process.

6 Claims, 5 Drawing Sheets

(51) Int. Cl.
*C25D 7/06* (2006.01)
*C25D 17/10* (2006.01)
*C25D 21/00* (2006.01)

(56) References Cited

FOREIGN PATENT DOCUMENTS

| | | |
|---|---|---|
| CN | 105177658 A | 12/2015 |
| CN | 112663119 A | 4/2021 |
| KR | 101681485 B1 | 12/2016 |

* cited by examiner

DEVICE AND METHOD FOR PREVENTING COPPER PLATING OF CONDUCTOR ROLL

TECHNICAL FIELD

The present invention relates to the technical field of manufacturing of copper electroplating films, and particularly relates to a device and method for preventing copper plating of a conductor roll.

BACKGROUND

During the process of copper film electroplating, a plating surface will have a certain amount of bath on the surfaces thereof. When the plating product is in contact with the conductor roll in the process of bypassing the conductor roll for electroplating, the bath may also be in contact with the conductor roll to cause an electroplating reaction between the bath and the conductor roll so that a large area of copper is deposited on the surface of the conductor roll, and the deposited copper will have a great impact on the production of films. For example, copper particles or spines deposited at a certain point will pierce or scratch films, which affects the quality of the plating product.

To solve this problem, the frequently-used copper removal method in the industry is a physical method, and the conductor roll is sprayed and cleaned by physical methods, or copper on the surface of the conductor roll is removed with a scraper. For example, a Chinese patent with a publication number of CN202898572U discloses a device for preventing copper plating of a conductor roll, which cleans up residual copper powder on the conductor roll by arrangement of a spraying pipe on the bottom of the conductor roll so as to prevent copper electroplating of the conductor roll.

However, the existing physical methods can only remove the deposited copper formed on the surface of the conductor roll, which cannot remove residual copper particles on the surface of the conductor roll completely or meet the requirements of non-metallic copper plating, and affects effective components of the bath so as to affect the copper plating effect. Moreover, such copper removal methods require additional steps to remove copper in the process of copper plating, which makes the equipment implementation process more complicated The above defects are worth improving.

SUMMARY

To overcome the defects in the prior art, the present invention provides a device and method for preventing copper plating of a conductor roll.

The present invention has the following technical solution:

A device for preventing copper plating of a conductor roll, comprising:

An electroplating pool, wherein plating pool bath and an electroplating anode are arranged in the electroplating pool;

Auxiliary tanks, wherein auxiliary tank bath, an auxiliary electrode completely immersed in the auxiliary tank bath and a conductor roll half immersed in the auxiliary tank bath are arranged in the auxiliary tank, and the plating product bypasses the conductor roll not immersed in the auxiliary tank bath and passes the electroplating anode;

The auxiliary tank bath is communicated with the plating pool bath, the electroplating anode is connected to the positive output end of a first power source, one end of the conductor roll is connected to the negative output end of the first power source, the other end of the conductor roll is connected to the positive output end of a second power source, and the auxiliary electrode is connected to the negative output end of the second power source.

The present invention according to the above solution, wherein the auxiliary tanks comprise an upper auxiliary tank with an opening on the lower end, an upper conductor roll is arranged at the opening, the upper conductor roll is hermetically connected with the upper auxiliary tank, the upper side of the upper conductor roll is immersed in upper tank bath in the upper auxiliary tank, the lower side is exposed from the upper auxiliary tank, and the plating product bypasses the lower side of the upper conductor roll.

Further, an upper auxiliary electrode is arranged in the upper tank bath, and the upper auxiliary electrode is located directly above the upper conductor roll.

Further, the side of the upper auxiliary tank is provided with an upper bath inlet and an upper bath outlet, and the upper tank bath and the plating pool bath are communicated through the upper bath inlet and the upper bath outlet.

The present invention according to the above solution, wherein the auxiliary tanks comprise a lower auxiliary tank with an opening on the upper end, a lower conductor roll is arranged at the opening, the lower side of the lower conductor roll is immersed in lower tank bath in the lower auxiliary tank, the upper side is exposed from the lower tank bath, and the plating product bypasses the upper side of the lower conductor roll.

Further, a lower auxiliary electrode is arranged in the lower tank bath, and the lower auxiliary electrode is located directly below the lower conductor roll.

The present invention according to the above solution, wherein the end of the auxiliary electrode is connected with an electrode wire, and the electrode wire is connected with the negative output end of the second power source; and the ends of the conductor roll are connected with conductive slip rings through conducting bars, the conductive slip ring located on one end of the conductor roll is connected with the negative output end of the first power source, and the conductive slip ring located on the other end of the conductor roll is connected with the positive output end of the second power source.

In another aspect, a method for preventing copper plating of a conductor roll, wherein a conductor roll and an electroplating anode are respectively connected to the negative output end and the positive output end of a first power source, and the conductor roll and the electroplating anode electroplate a plating product flowing through plating pool bath after being electrified, further comprising the electrolyzing step of the conductor roll: the conductor roll is connected to the positive output end of a second power source and mated with an auxiliary electrode connected to the negative output end of the second power source to realize the electrolysis of the conductor roll so that the conductor roll avoids copper deposition when electroplating the plating product.

The present invention according to the above solution, wherein an auxiliary tank is arranged, a part of the conductor roll is immersed in auxiliary tank bath in the auxiliary tank, an auxiliary electrode in the auxiliary tank and the conductor roll are respectively connected to the negative output end and the positive output end of a second power source, and the electrolysis of the conductor roll is realized through the second power source, the auxiliary electrode and the auxiliary tank bath.

The present invention according to the above solution, wherein one end of the conductor roll is connected to the negative output end of the first power source, and the other end is connected to the positive output end of the second power source.

The present invention according to the above solution has the following beneficial effects: an electrolysis device for the conductor roll is added before electroplating, and by adding an auxiliary electrode connected in series with the conductor roll, the bath in the auxiliary tank forms a loop, the conductor roll acts as an anode for electrolysis, and the electrolysis of the bath near the conductor roll can be realized on the premise of completing electroplating by the conductor roll so that the copper electroplating process and the copper electrolyzing process are balanced on the conductor roll to avoid residual copper on the conductor roll so as to improve the copper plating quality of the plating product. The present invention has simple structure in the whole device and only needs a small electrolytic cell to realize the whole function without increasing the procedure of the electroplating process or affecting the implementation of the electroplating process.

Figure 1:
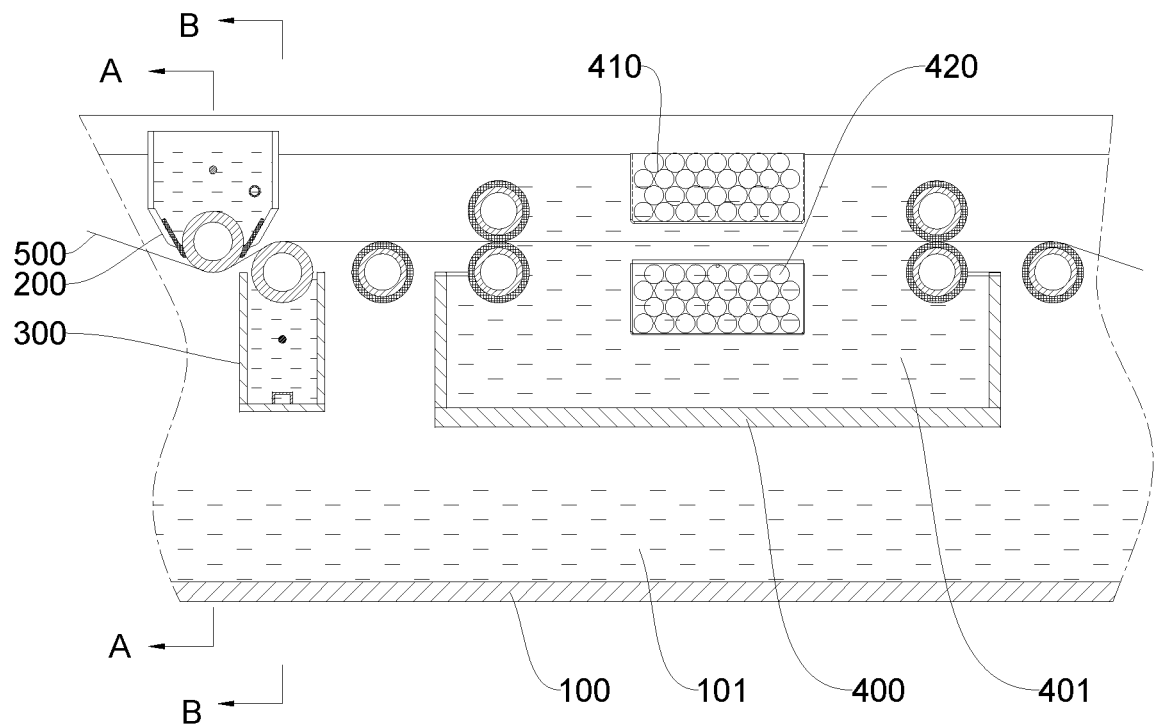
FIG. 1 is a structural schematic diagram of the present invention.
Figure 2:
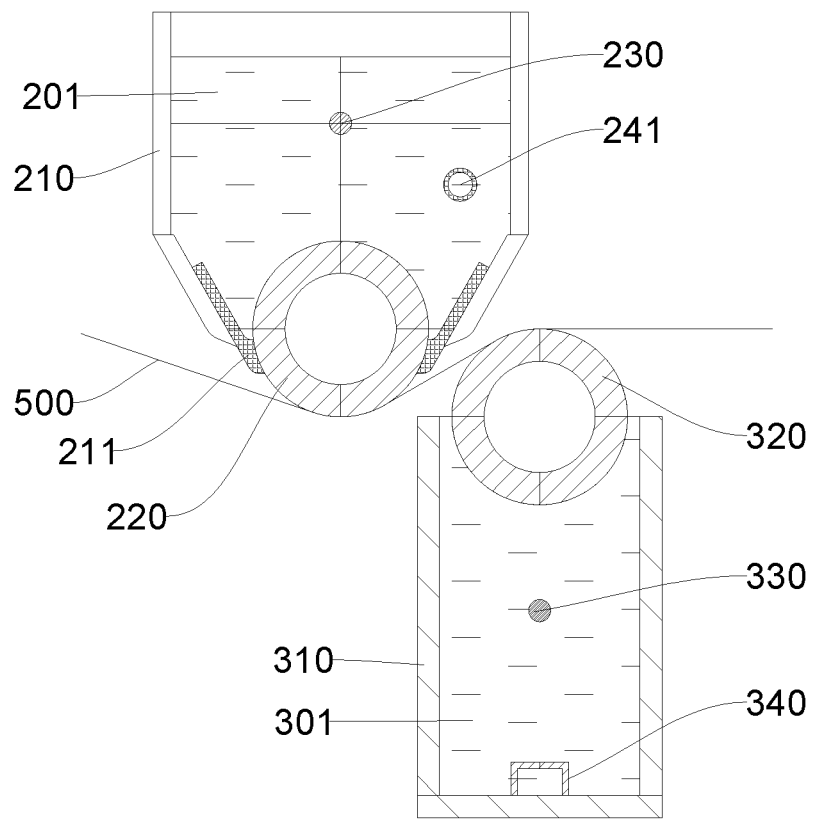
FIG. 2 is a structural schematic diagram of an upper auxiliary tank and a lower auxiliary tank.
Figure 3:
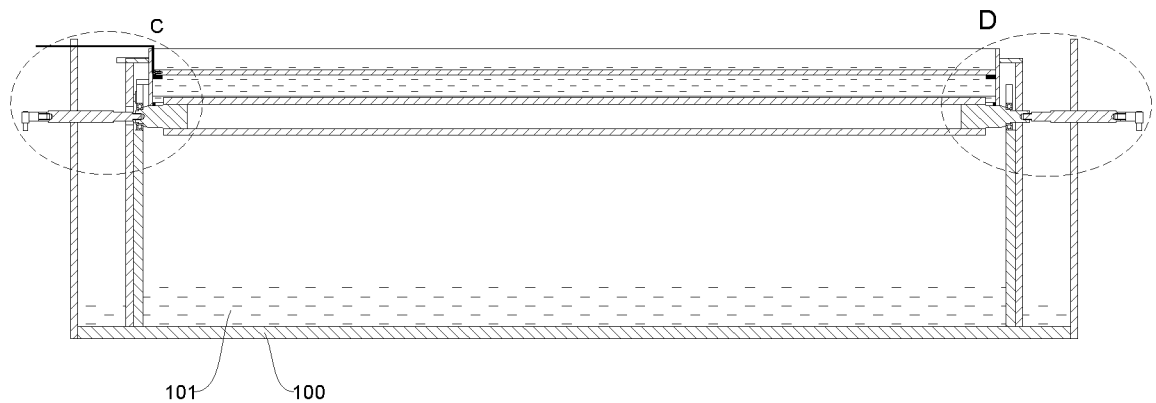
FIG. 3 is a section view of A-A in FIG. 1.
Figure 4:
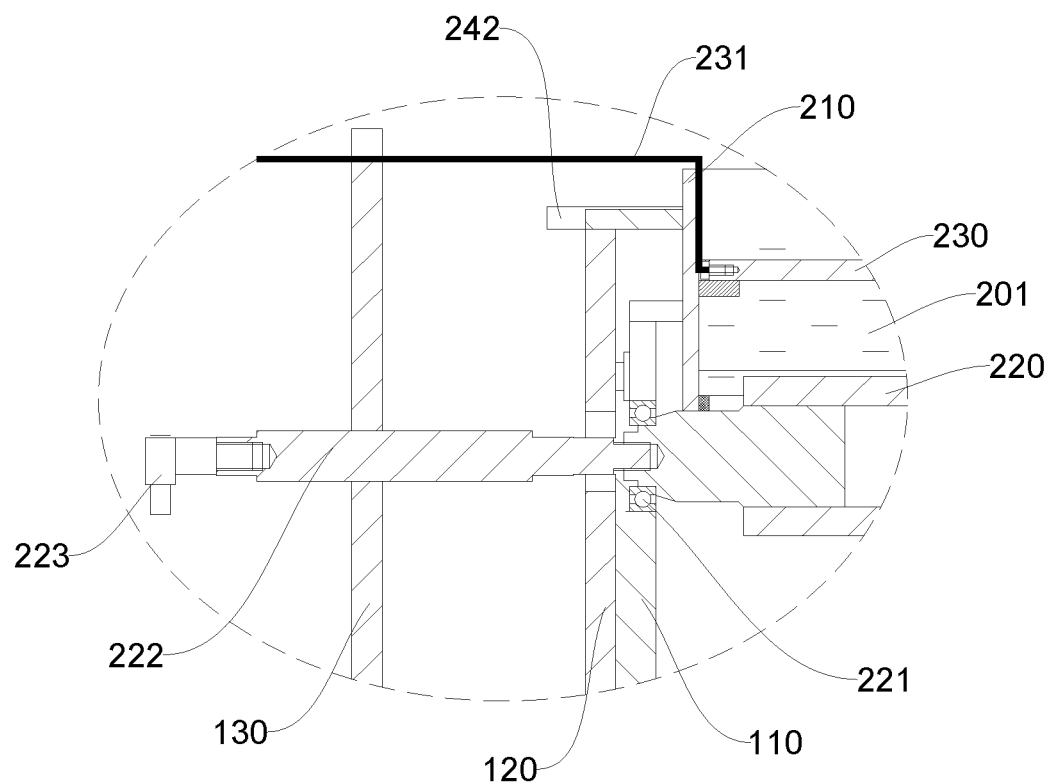
FIG. 4 is an amplified view of part C in FIG. 3.
Figure 5:
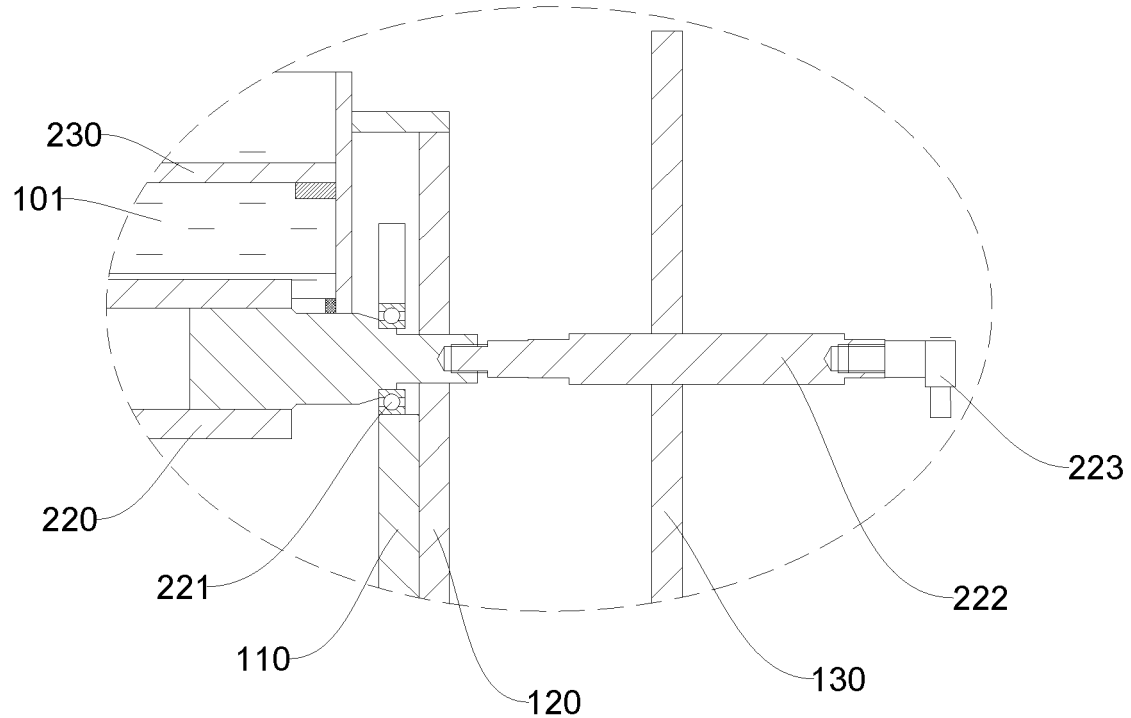
FIG. 5 is an amplified view of part D in FIG. 3.
Figure 6:
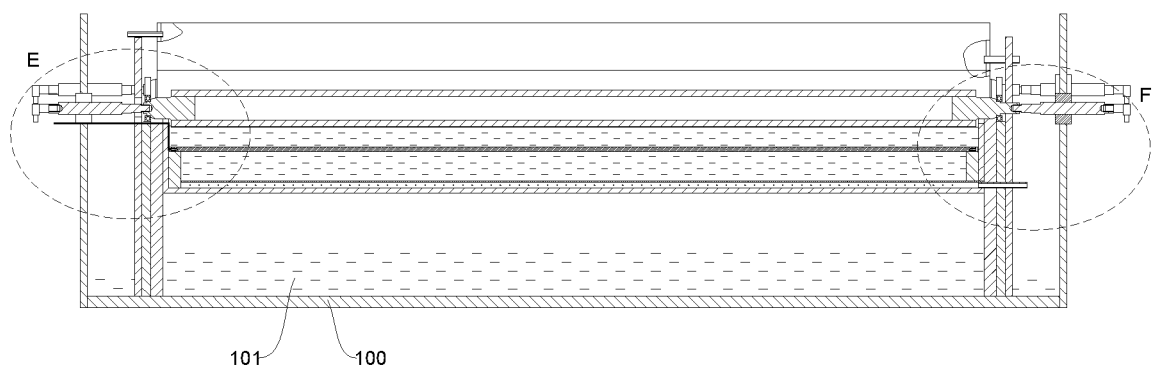
FIG. 6 is a section view of B-B in FIG. 1.
Figure 7:
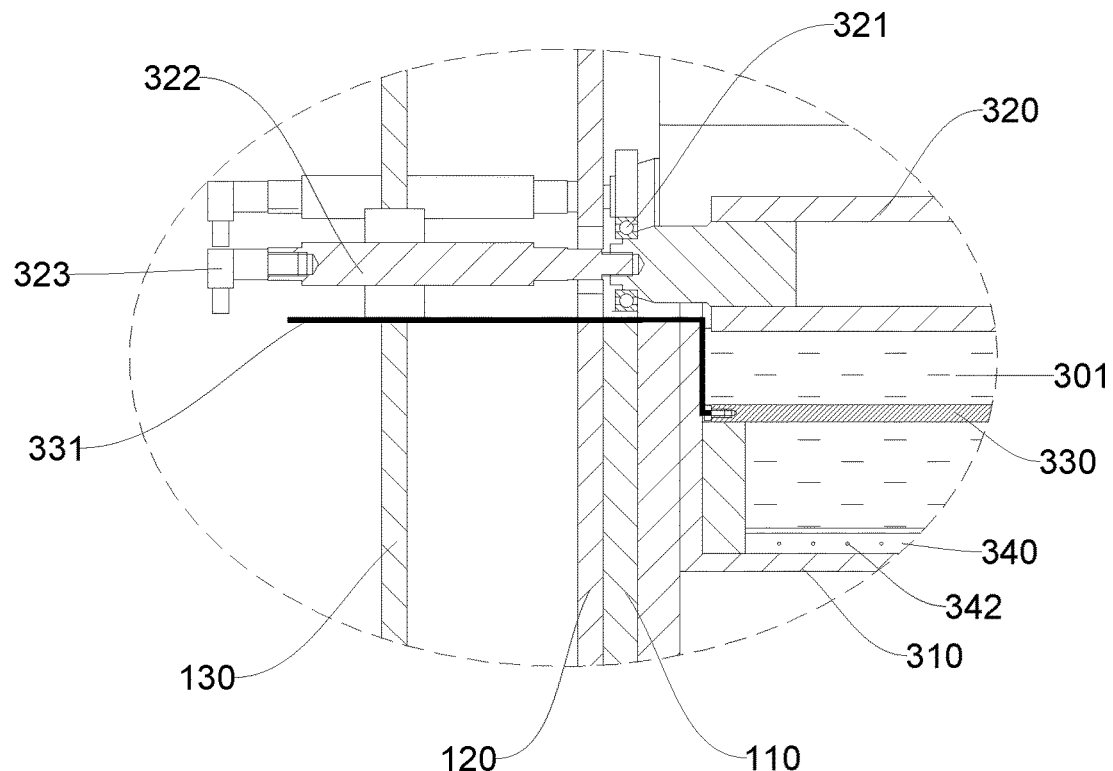
FIG. 7 is an amplified view of part E in FIG. 6.
Figure 8:
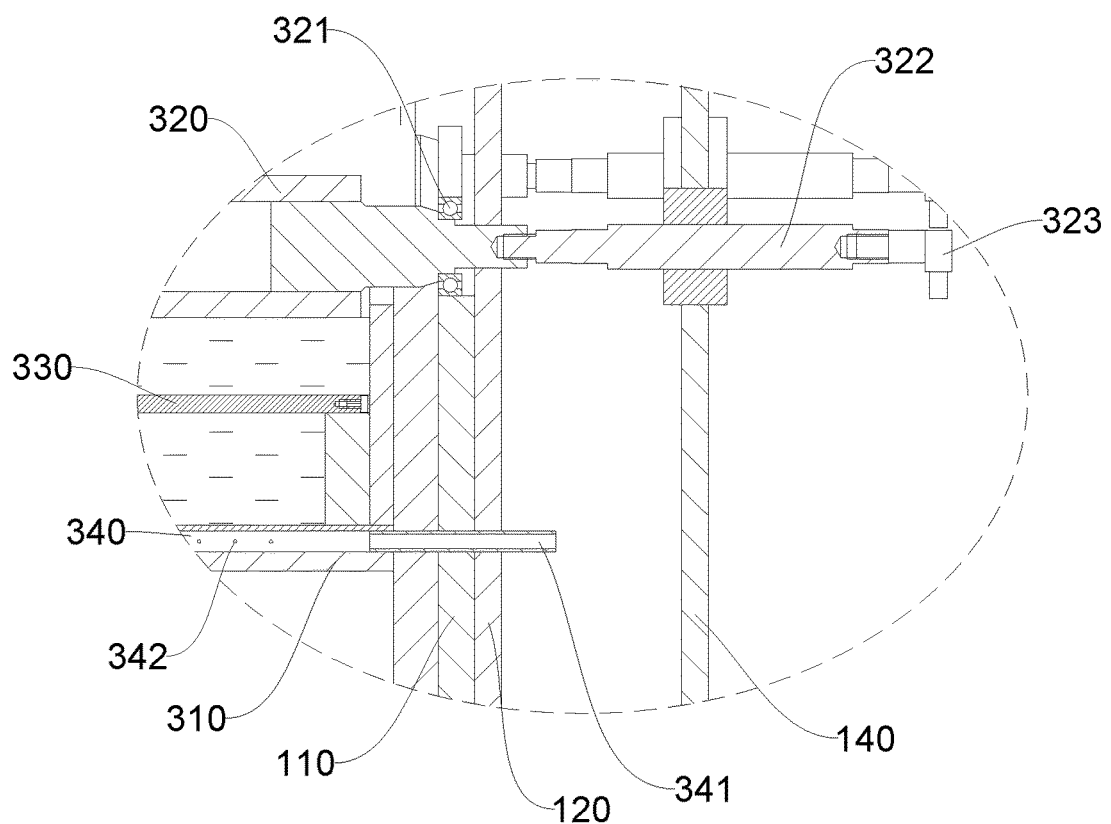
FIG. 8 is an amplified view of part F in FIG. 6.
Figure 9:
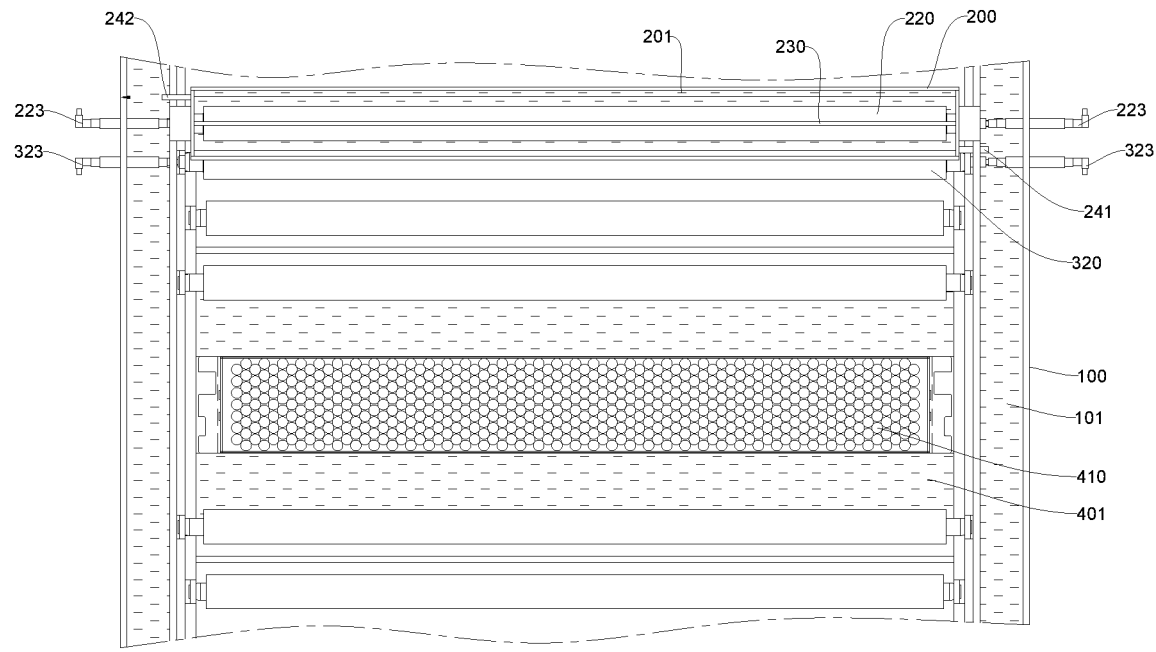
FIG. 9 is a top view of the present invention.

In the figures, 01—first rectifier; 02—second rectifier; 100—main body tank; 101—main tank bath; 110—first main tank vertical plate; 120—second main tank vertical plate; 130—third main tank vertical plate;
200—upper auxiliary tank; 201—upper tank bath; 210—upper tank body; 211—seal plate; 220—upper conductor roll; 221—upper bearing; 222—upper conducting bar; 223—upper conductive slip ring; 230—upper auxiliary electrode; 231—upper electrode wire; 241—upper bath inlet; 242—upper bath outlet;
300—lower auxiliary tank; 301—lower tank bath; 310—lower tank body; 320—lower conductor roll; 321—lower bearing; 322—lower conducting bar; 323—lower conductive slip ring; 330—lower auxiliary electrode; 331—lower electrode wire; 340—distribution pipe; 341—lower bath inlet; 342—distribution hole;
400—electroplating pool; 401—plating pool bath; 410—upper electroplating anode; 420—lower electroplating anode;
500—plating product.

DETAILED DESCRIPTION

The present invention is further described below in combination with the drawings and embodiments.

A method for preventing copper plating of a conductor roll, wherein a conductor roll and an electroplating anode are respectively connected to the negative output end and the positive output end of a first power source, and the positive output end of the first power source, the electroplating anode, the bath, the conductor roll and the negative output end of the first power source are connected in sequence to form an electroplating loop. The conductor roll and the electroplating anode electroplate a plating product flowing through the electroplating pool after being electrified.

With the progress of electroplating, more copper particles are deposited on the surface of the conductor roll. To avoid copper deposition caused by the conductor roll under the influence of the nearby bath, the synchronous electrolysis of the conductor roll is also carried out in the process of electroplating realized by the conductor roll and the electroplating anode. That is, the conductor roll is connected to the positive output end of a second power source and mated with an auxiliary electrode connected to the negative output end of the second power source to realize the electrolysis of the conductor roll so that the conductor roll avoids copper deposition when electroplating the plating product.

To realize the electrolysis of the bath near the conductor roll, an auxiliary tank is arranged in the position of the conductor roll, a part of the conductor roll is immersed in the auxiliary tank bath in the auxiliary tank, an auxiliary electrode in the auxiliary tank and the conductor roll are respectively connected to the negative output end and the positive output end of the second power source, and the positive output end of the second power source, the conductor roll, the auxiliary tank bath, the auxiliary electrode and the negative output end of the second power source are connected in sequence to form an electrolysis loop. The electrolysis of the conductor roll is realized through the second power source, the auxiliary electrode and the auxiliary tank bath. As different electroplating devices have different structures, the specific arrangement position of the conductor roll is different, so the auxiliary tank can be located in different positions of the whole electroplating device, and the specific installation position is not limited here.

The present invention makes the conductor roll act as a cathode when electroplating the plating product and act as an anode for copper electrolysis when mating with the auxiliary electrode by adding the auxiliary tank, the auxiliary electrode and the auxiliary tank bath and adding an electrolysis loop in the auxiliary tank, which realizes the balance of copper electroplating and copper electrolysis on the conductor roll. To realize the simultaneous connection of the conductor roll to the first power source and the second power source, in the present invention, one end of the conductor roll is connected to the negative output end of the first power source, and the other end is connected to the positive output end of the second power source.

As shown in FIG. 1 to FIG. 9, a device for preventing copper plating of a conductor roll, used for realizing the method for preventing copper plating of a conductor roll, comprises an electroplating pool 400 and auxiliary tanks arranged in front of the electroplating pool 400. Plating pool bath 401 and an electroplating anode are arranged in the electroplating pool 400, the electroplating anode is connected to the positive output end of a first power source, one end of the conductor roll is connected to the negative output end of the first power source, and the electroplating anode and the conductor roll interact with each other through the plating pool bath 401 to realize the electroplating of a plating product 500. Preferably, the auxiliary tank is made of PVC sheets or other acid and alkali corrosion resistant materials besides PVC to adapt to the electroplating or electrolyzing environment of the bath.

Auxiliary tank bath, an auxiliary electrode immersed in the auxiliary tank bath and a conductor roll half immersed in the auxiliary tank bath are arranged in the auxiliary tank, and the plating product 500 bypasses the conductor roll not immersed in the auxiliary tank bath and passes the electroplating anode. The auxiliary electrode is arranged in parallel to the conductor roll, the other end of the conductor roll is connected to the positive output end of a second power source, the auxiliary electrode is connected to the negative output end of the second power source, and the conductor roll and the auxiliary electrode interact with each other through the auxiliary tank bath to realize the electrolysis of the conductor roll and the nearby auxiliary tank bath. To ensure the interaction of the conductor roll and the electroplating anode and realize the electroplating process, the auxiliary tank bath is communicated with the plating pool bath 401.

Preferably, the auxiliary electrode is a copper bar, and also can be a copper bar, a titanium bar, a stainless steel bar, a titanium clad copper, etc.

As show in FIG. 1 to FIG. 5 and FIG. 9, in the process of electroplating the upper surface of the plating product 500, the plating product 500 bypasses the lower surface of the conductor roll and enters the electroplating pool 400, and the electroplating anode in the electroplating pool 400 is located above the plating product 500.

For the conductor roll in such connection form, an upper auxiliary tank 200 is arranged in front of the electroplating pool 400, specifically: the upper auxiliary tank 200 comprises an upper tank body 210, the lower end of the upper tank body 210 is provided with an opening, and an upper conductor roll 220 is arranged at the opening. Preferably, the bottom of the upper tank body 210 is trapezoidal.

The upper side of the upper conductor roll 220 is immersed in upper tank bath 201 in the upper auxiliary tank 200, the lower side is exposed from the upper auxiliary tank 200, and the plating product 500 bypasses the lower side of the upper conductor roll 220. An upper electroplating anode 410 is arranged in the electroplating pool 400 to be mated with the upper conductor roll 220, and the plating product 500 is penetrated through the lower side of the upper electroplating anode 410. Preferably, in the cross section of the upper conductor roll 220, the part located in the upper auxiliary tank 200 is larger than that located outside the upper auxiliary tank 200, which will not affect the contact between the upper conductor roll 220 and the plating product 500 and can increase the contact area between the upper conductor roll 220 and the auxiliary tank bath.

To avoid leakage, the upper conductor roll 220 is hermetically connected with the upper auxiliary tank 200. A seal plate 211 is arranged at the opening in the embodiment, the upper conductor roll 220 is hermetically connected with the upper auxiliary tank 200 through the seal plate 211. Preferably, the seal plate 211 is a hypalon seal to ensure that no serious leakage occurs in the position of the opening.

An upper auxiliary electrode 230 is arranged in the upper tank bath 201, and the upper auxiliary electrode 230 is located directly above the upper conductor roll 220, which can ensure that the current distribution in the upper auxiliary tank 200 is more uniform and ensure the balance of the electroplating process and the electrolyzing process. To ensure the normal electroplating process and electrolyzing process, the level of the upper tank bath 201 is higher than the upper surface of the upper auxiliary electrode 230, and the level of the plating pool bath 401 is higher than the lower surface of the upper electroplating anode 410. In the embodiment, the upper auxiliary electrode 230 is completely immersed in the upper tank bath 201, which can make the current transfer more uniform and the current distribution in the upper tank bath 201 more uniform when the upper auxiliary electrode 230 is used as a negative pole for copper electrolysis.

The end of the upper auxiliary electrode 230 is connected with an upper electrode wire 231, and the upper electrode wire 231 is connected with the negative output end of the second power source; and the ends of the upper conductor roll 220 are connected with upper conductive slip rings 223 through upper conducting bars 222, the upper conductive slip ring 223 located on one end of the upper conductor roll 220 is connected with the negative output end of the first power source, and the upper conductive slip ring 223 located on the other end of the upper conductor roll 220 is connected with the positive output end of the second power source.

The side of the upper auxiliary tank 200 is provided with an upper bath inlet 241 and an upper bath outlet 242, and the upper tank bath 201 and the plating pool bath 401 are communicated through the upper bath inlet 241 and the upper bath outlet 242. Preferably, the upper bath outlet 242 and the upper bath inlet 241 are located on both ends of the upper tank body 210 to ensure that the bath in the upper auxiliary tank 200 can fully react before flowing out. Further preferably, the upper bath outlet 242 is higher than the upper bath inlet 241, which can also promote the balanced reaction of the bath in the upper auxiliary tank 200.

As shown in FIG. 1, FIG. 2, FIG. 6 and FIG. 9, in the process of electroplating the lower surface of the plating product 500, the plating product 500 bypasses the upper surface of the conductor roll and enters the electroplating pool 400, and the electroplating anode in the electroplating pool 400 is located below the plating product.

For the conductor roll in such connection form, a lower auxiliary tank 300 is arranged in front of the electroplating pool 400, specifically: the lower auxiliary tank 300 comprises a lower tank body 310, the upper end of the lower tank body 310 is provided with an opening, and a lower conductor roll 320 is arranged at the opening.

The lower side of the lower conductor roll 320 is immersed in lower tank bath 301 in the lower auxiliary tank 300, the upper side is exposed from the lower tank bath 301, and the plating product 500 bypasses the upper side of the lower conductor roll 320. A lower electroplating anode 420 is arranged in the electroplating pool 400 to be mated with the lower conductor roll 320, the lower electroplating anode 420 is immersed in the plating pool bath 401, and the plating product 500 is penetrated through the upper side of the lower electroplating anode 420. A lower auxiliary electrode 330 is arranged in the lower tank bath 301, and the lower auxiliary electrode 330 is located directly below the lower conductor roll 320, which can ensure that the current distribution in the lower auxiliary tank 300 is more uniform and ensure the balance of the electroplating process and the electrolyzing process.

The end of the lower auxiliary electrode 330 is connected with a lower electrode wire 331, and the lower electrode wire 331 is connected with the negative output end of the second power source; and the ends of the lower conductor roll 320 are connected with lower conductive slip rings 323 through lower conducting bars 322, the lower conductive slip ring 323 located on one end of the lower conductor roll 320 is connected with the negative output end of the first power source, and the lower conductive slip ring 323 located on the other end of the lower conductor roll 320 is connected with the positive output end of the second power source.

In a specific embodiment, one end of a distribution hole 342 is communicated with a lower bath inlet 341 arranged on the tank body, and the plating pool bath 401 and the lower tank bath 301 are communicated through the lower bath inlet 341, a distribution pipe 340 and an open on the upper end of the lower auxiliary tank 300. In the embodiment, to achieve the consistent concentration of the lower tank bath 301 in the lower auxiliary tank 300 and avoid high concentration at the lower bath inlet 341 and low concentration in the position away from the lower bath inlet 341, the distribution pipe 340 is arranged in the lower auxiliary tank 300, the distribution pipe 340 is uniformly provided with a plurality of distribution holes 342, and the distribution pipe 340 is communicated with the lower bath inlet 341 in the side of the lower auxiliary tank 300 as the lower tank bath 301 overflows from the opening on the upper end.

In another specific embodiment, one end of the distribution hole 342 is communicated with the lower bath inlet 341 arranged in the lower tank body 310, the lower tank body 310 is also provided with a lower bath outlet (not shown in the figure, the same below), and the plating pool bath 401 and the lower tank bath 301 are communicated through the lower bath inlet 341, the distribution pipe 340 and the lower bath outlet.

As show in FIG. 1, FIG. 3, FIG. 6 and FIG. 9, the auxiliary tanks and the electroplating pool 400 of the present invention are fixed above the main body tank 100, main tank bath 101 is arranged in the main body tank 100, and the auxiliary tank bath and the plating pool bath 401 are communicated with the main tank bath 101. Preferably, the side of the main body tank 100 is provided with a first main tank vertical plate 110, a second main tank vertical plate 120 and a third main tank vertical plate 130, the first main tank vertical plate 110 is located inside the second main tank vertical plate 120, and the second main tank vertical plate 120 is located inside the third main tank vertical plate 130.

The ends of the conductor roll are sheathed on the first main tank vertical plate 110 through bearings, the ends of the conductor roll are connected with conductive slip rings through conducting bars, the inner end of the conducting bar is connected with the conductor roll across the second main tank vertical plate 120, the outer end is connected with the conductive slip ring across the third main tank vertical plate 130, the conductive slip ring located on one end of the conductor roll is connected with the negative output end of the first power source, and the conductive slip ring located on the other end of the conductor roll is connected with the positive output end of the second power source.

Specifically, both ends of the upper conductor roll 220 are sheathed on the upper side of the first main tank vertical plate 110 through upper bearings 221, the inner end of the upper conducting bar 222 is connected with the upper conductor roll 220 across the second main tank vertical plate 120, the outer end is connected with the upper conductive slip ring 223 across the third main tank vertical plate 130, the upper conductive slip ring 223 located on one end of the upper conductor roll 220 is connected with the negative output end of the first power source, and the upper conductive slip ring 223 located on the other end of the upper conductor roll 220 is connected with the positive output end of the second power source. Both ends of the lower conductor roll 320 are sheathed on the first main tank vertical plate 110 through lower bearings 321 and located below the upper conductor roll 220, the inner end of the lower conducting bar 322 is connected with the lower conductor roll 320 across the second main tank vertical plate 120, the outer end is connected with the lower conductive slip ring 323 across the third main tank vertical plate 130, the lower conductive slip ring 323 located on one end of the lower conductor roll 320 is connected with the negative output end of the first power source, and the lower conductive slip ring 323 located on the other end of the lower conductor roll 320 is connected with the positive output end of the second power source.

The main body tank 100 in the present invention not only provides a middle channel for the bath between the auxiliary tanks and the main body tank 100 to circulate, but also can support the auxiliary tanks and the main body tank 100. In addition, when the lower auxiliary tank 300 is not provided with a lower bath outlet, the lower tank bath 301 can overflow directly from the upper edge of the lower auxiliary tank 300 and flow into the main body tank 100, and the communication among the lower tank bath 301, the main tank bath 101 and the plating pool bath 401 is realized through a very fine liquid pipeline.

Figure 10:
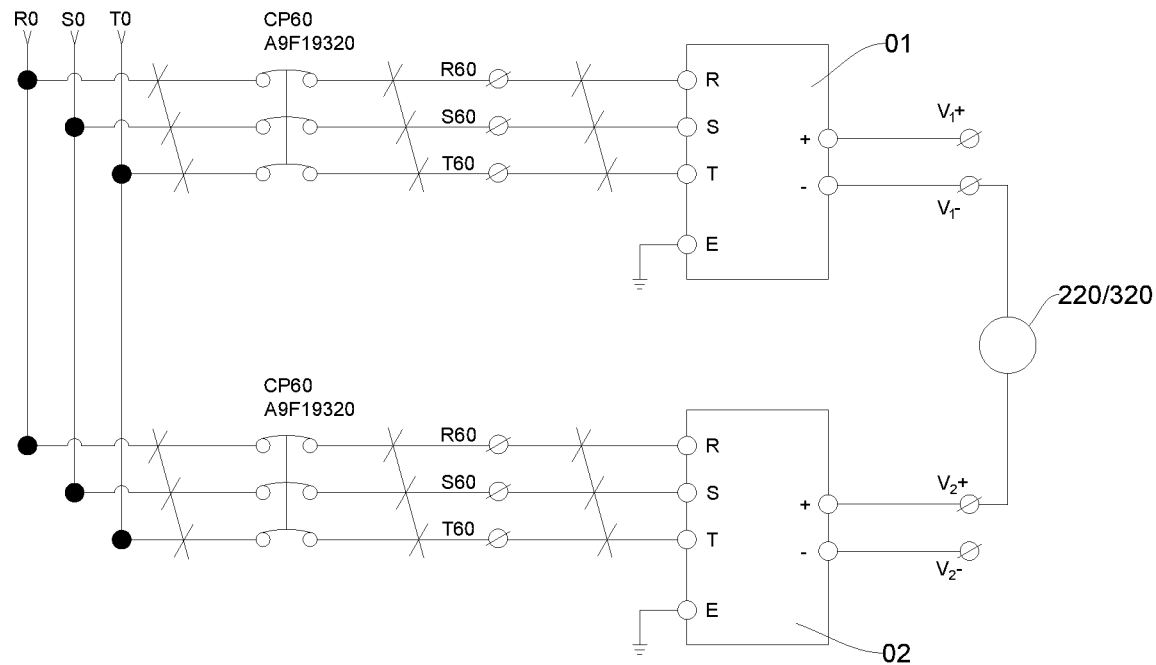
FIG. 10 is a circuit diagram for implementation of the present invention.

As shown in FIG. 10, in the implementation process of the present invention:

The positive output end V1+ of the first power source is connected with the electroplating anode, and the negative output end V1− is connected with one end of the conductor roll (the upper conductor roll 220 and the lower conductor roll 320). The positive output end V1+ of the first power source, the electroplating anode, the plating pool bath, the conductor roll and the negative output end V1− of the first power source are connected in sequence to form a complete current loop so as to realize the process of copper electroplating on the surface of the plating product.

The positive output end V2+ of the second power source is connected with the other end of the conductor roll (the upper conductor roll 220 and the lower conductor roll 320), and the negative output end V2− is connected with the auxiliary electrode. The positive output end V2+ of the second power source, the conductor roll, the auxiliary tank bath, the auxiliary electrode and the negative output end V2− of the second power source are connected in sequence to form a complete current loop so as to realize the electrolyzing process of copper on the surface of the conductor roll (the upper conductor roll 220 and the lower conductor roll 320).

Since the current in the electroplating process is much larger than that in the electrolyzing process, the connection of the conductor roll (the upper conductor roll 220 and the lower conductor roll 320) to the second power source has no influence on the process of communicating with the first power source and realizing copper electroplating.

The circuit connection realizes: the conductor roll (the upper conductor roll 220 and the lower conductor roll 320) acts as a cathode in the process of realizing copper plating of the plating product in conjunction with the electroplating anode and acts as an anode in the process of electrolyzing copper in conjunction with the auxiliary electrode so as to ensure the balance between copper electroplating and copper electrolysis on the surface of the conductor roll (the upper conductor roll 220 and the lower conductor roll 320) on the premise of realizing copper plating, thus realize no residual copper on the conductor roll (the upper conductor roll 220 and the lower conductor roll 320).

In the embodiment, the first power source comprises a first rectifier 01 connected with a three-phase power surface, the second power source comprises a second rectifier 02 connected with a three-phase power source, and a circuit breaker is respectively arranged on branch circuits where the two rectifiers are located for circuit protection. In other embodiments, the first power source and the second power source can also be pulse power sources.

In the present invention, the conductor roll is treated by electrolysis, which avoids copper deposition in the process of electroplating the plating product by the conductor roll and solves the problem that the influence of bath cannot be considered in the traditional physical copper removal methods; the present invention can effectively solve the problem of residual copper and improve the electroplating quality of the plating product; and the present invention makes the conductor roll act as a cathode when electroplating the plating product and act as an anode for copper electrolysis when mating with the auxiliary electrode by installing the auxiliary tanks and the auxiliary electrode and adding an electrolysis loop in the auxiliary tank, which realizes the balance of copper electroplating and copper electrolysis on the conductor roll.

It should be understood that, for those ordinary skilled in the art, improvements and alternations can be made according to the above description, and all these improvements and alternations shall belong to the protection scope of appended claims of the present invention.

The patent of present invention is exemplarily described above in combination with the drawings. Obviously, the implementation of the patent of the present invention is not limited by the above modes. Various improvements made by adopting the method ideas and technical solutions of the patent of the present invention or the ideas and technical solutions of the patent of the present invention directly applied to other occasions without improvements shall be within the protection scope of the present invention.

In the present invention, an electrolysis device for the conductor roll is added before electroplating, and by adding an auxiliary electrode connected in series with the conductor roll, the bath in the auxiliary tank forms a loop, the conductor roll acts as an anode for electrolysis, the electrolysis of the bath near the conductor roll can be realized on the premise of completing electroplating by the conductor roll so that the copper electroplating process and the copper electrolyzing process are balanced on the conductor roll to avoid residual copper on the conductor roll so as to improve the copper plating quality of the plating product, and only a small electrolytic cell is needed to achieve the whole function without increasing the procedure of the electroplating process, so the present invention has practicality.

We claim:

1. A device for preventing copper plating of a conductor roll, comprising:
   an electroplating pool, wherein a plating pool bath and an electroplating anode are arranged in the electroplating pool;
   auxiliary tanks, wherein an auxiliary tank bath, an auxiliary electrode completely immersed in the auxiliary tank bath and a conductor roll half immersed in the auxiliary tank bath are arranged in the auxiliary tank, and a plating product bypasses the conductor roll not immersed in the auxiliary tank bath and passes the electroplating anode;
   wherein the auxiliary tank bath is communicated with the plating pool bath, the electroplating anode is connected to a positive output end of a first power source, one end of the conductor roll is connected to a negative output end of the first power source, another end of the conductor roll is connected to a positive output end of a second power source, and the auxiliary electrode is connected to a negative output end of the second power source;
   wherein the auxiliary tanks comprise an upper auxiliary tank with an opening on a lower end, an upper conductor roll is arranged at the opening on the lower end, the upper conductor roll is hermetically connected with the upper auxiliary tank, an upper side of the upper conductor roll is immersed in an upper tank bath in the upper auxiliary tank, a lower side of the upper conductor roll is exposed from the upper auxiliary tank, and the plating product bypasses the lower side of the upper conductor roll.

2. The device for preventing copper plating of a conductor roll according to claim 1, wherein an upper auxiliary electrode is arranged in the upper tank bath, and the upper auxiliary electrode is located directly above the upper conductor roll.

3. The device for preventing copper plating of a conductor roll according to claim 1, wherein a side of the upper auxiliary tank is provided with an upper bath inlet and an upper bath outlet, and the upper tank bath and the plating pool bath are communicated through the upper bath inlet and the upper bath outlet.

4. The device for preventing copper plating of a conductor roll according to claim 1, wherein the auxiliary tanks comprise a lower auxiliary tank with an opening on an upper end, a lower conductor roll is arranged at the opening on the upper end, a lower side of the lower conductor roll is immersed in a lower tank bath in the lower auxiliary tank, an upper side of the lower conductor roll is exposed from the lower tank bath, and the plating product bypasses the upper side of the lower conductor roll.

5. The device for preventing copper plating of a conductor roll according to claim 4, wherein a lower auxiliary electrode is arranged in the lower tank bath, and the lower auxiliary electrode is located directly below the lower conductor roll.

6. The device for preventing copper plating of a conductor roll according to claim 1, wherein the auxiliary electrode is connected with an electrode wire, and the electrode wire is connected with the negative output end of the second power source; and wherein ends of the conductor roll are connected with conductive slip rings through conducting bars, the conductive slip rings are respectively connected with the negative output end of the first power source and the positive output end of the second power source.

\* \* \* \* \*